(12) United States Patent
Soukhman et al.

(10) Patent No.: US 10,817,206 B2
(45) Date of Patent: Oct. 27, 2020

(54) SYSTEM AND METHOD FOR MANAGING METADATA REDIRECTIONS

(71) Applicant: EMC IP Holding Company, LLC, Hopkinton, MA (US)

(72) Inventors: Alex Soukhman, Raanana (IL); Vladimir Shveidel, Pardes-Hana (IL); Uri Shabi, Tel Mond (IL); Ronen Gazit, Tel Aviv (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 86 days.

(21) Appl. No.: 16/261,880

(22) Filed: Jan. 30, 2019

(65) Prior Publication Data
US 2020/0241789 A1 Jul. 30, 2020

(51) Int. Cl.
*G06F 3/06* (2006.01)

(52) U.S. Cl.
CPC .......... *G06F 3/0647* (2013.01); *G06F 3/0604* (2013.01); *G06F 3/064* (2013.01); *G06F 3/0673* (2013.01)

(58) Field of Classification Search
CPC ...... G06F 3/0604; G06F 3/0635; G06F 3/064; G06F 3/0647; G06F 3/0673; G06F 12/0646; G06F 12/1009; G06F 12/109; G06F 2212/651; G06F 2212/657

USPC .......... 711/165, 202, 203, 206, 209
See application file for complete search history.

(56) References Cited

U.S. PATENT DOCUMENTS

| | | | |
|---|---|---|---|
| 8,156,305 B1* | 4/2012 | Goodson | G06F 12/1009 711/202 |
| 2016/0019161 A1* | 1/2016 | Patel | G06F 12/1027 711/206 |
| 2016/0170899 A1* | 6/2016 | Huang | G06F 12/1009 711/206 |

* cited by examiner

*Primary Examiner* — Gary J Portka
(74) *Attorney, Agent, or Firm* — Brian J. Colandreo; Mark H. Whittenberger; Holland & Knight LLP

(57) ABSTRACT

A method, computer program product, and computing system for identifying one or more first layer metadata blocks that map to one or more second layer metadata blocks. A subset of the second layer metadata blocks that map to another second layer metadata block from the one or more second layer metadata blocks may be identified, thus defining one or more redirecting second layer metadata blocks. For each first layer metadata block of the one or more first layer metadata blocks: One or more first layer metadata blocks that map to the one or more redirecting second layer metadata blocks may be determined and the one or more first layer metadata blocks that map to the one or more redirecting second layer metadata blocks may be remapped to map to a target second layer metadata block.

20 Claims, 11 Drawing Sheets

SYSTEM AND METHOD FOR MANAGING METADATA REDIRECTIONS

BACKGROUND

Storing and safeguarding electronic content may be beneficial in modern business and elsewhere. Accordingly, various methodologies may be employed to protect and distribute such electronic content. However, as data accumulates and is modified in storage systems, various procedures may be necessary to reorganize or cleanup the data to maintain acceptable latency. For example, modern log structure systems generally employ garbage collection to create empty chunks to store user data. This process may generally include user data relocation which may unfortunately create fragmentation for metadata blocks that map to the user data. As such, latency associated with retrieving data from the storage system may increase.

Summary of Disclosure

In one example implementation, a computer-implemented method executed on a computing device may include but is not limited to identifying one or more first layer metadata blocks that map to one or more second layer metadata blocks. A subset of the second layer metadata blocks that map to another second layer metadata block from the one or more second layer metadata blocks may be identified, thus defining one or more redirecting second layer metadata blocks. For each first layer metadata block of the one or more first layer metadata blocks: One or more first layer metadata blocks that map to the one or more redirecting second layer metadata blocks may be determined and the one or more first layer metadata blocks that map to the one or more redirecting second layer metadata blocks may be remapped to map to a target second layer metadata block.

One or more of the following example features may be included. The one or more second layer metadata blocks may map to one or more third layer metadata blocks configured to store user data. The target second layer metadata block may be determined from the one or more redirecting second layer metadata blocks. A source second layer metadata block may be determined from the one or more redirecting second layer metadata blocks. A plurality of pointers may be added to each of the one or more redirecting second layer metadata blocks pointing back to the second layer metadata block that maps to that redirecting second layer metadata block. The source second layer metadata block may be remapped to map to the target second layer metadata block. each entry of the plurality of entries of the one or more first layer metadata blocks is associated with a Logical Block Address (LBA) range.

In another example implementation, a computer program product resides on a computer readable medium that has a plurality of instructions stored on it. When executed by a processor, the instructions cause the processor to perform operations that may include but are not limited to identifying one or more first layer metadata blocks that map to one or more second layer metadata blocks. A subset of the second layer metadata blocks that map to another second layer metadata block from the one or more second layer metadata blocks may be identified, thus defining one or more redirecting second layer metadata blocks. For each first layer metadata block of the one or more first layer metadata blocks: One or more first layer metadata blocks that map to the one or more redirecting second layer metadata blocks may be determined and the one or more first layer metadata blocks that map to the one or more redirecting second layer metadata blocks may be remapped to map to a target second layer metadata block.

One or more of the following example features may be included. The one or more second layer metadata blocks may map to one or more third layer metadata blocks configured to store user data. The target second layer metadata block may be determined from the one or more redirecting second layer metadata blocks. A source second layer metadata block may be determined from the one or more redirecting second layer metadata blocks. A plurality of pointers may be added to each of the one or more redirecting second layer metadata blocks pointing back to the second layer metadata block that maps to that redirecting second layer metadata block. The source second layer metadata block may be remapped to map to the target second layer metadata block. each entry of the plurality of entries of the one or more first layer metadata blocks is associated with a Logical Block Address (LBA) range.

In another example implementation, a computing system includes at least one processor and at least one memory architecture coupled with the at least one processor, wherein the computing system is configured to perform operations that may include but are not limited to identifying one or more first layer metadata blocks that map to one or more second layer metadata blocks. A subset of the second layer metadata blocks that map to another second layer metadata block from the one or more second layer metadata blocks may be identified, thus defining one or more redirecting second layer metadata blocks. For each first layer metadata block of the one or more first layer metadata blocks: One or more first layer metadata blocks that map to the one or more redirecting second layer metadata blocks may be determined and the one or more first layer metadata blocks that map to the one or more redirecting second layer metadata blocks may be remapped to map to a target second layer metadata block.

One or more of the following example features may be included. The one or more second layer metadata blocks may map to one or more third layer metadata blocks configured to store user data. The target second layer metadata block may be determined from the one or more redirecting second layer metadata blocks. A source second layer metadata block may be determined from the one or more redirecting second layer metadata blocks. A plurality of pointers may be added to each of the one or more redirecting second layer metadata blocks pointing back to the second layer metadata block that maps to that redirecting second layer metadata block. The source second layer metadata block may be remapped to map to the target second layer metadata block. each entry of the plurality of entries of the one or more first layer metadata blocks is associated with a Logical Block Address (LBA) range.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
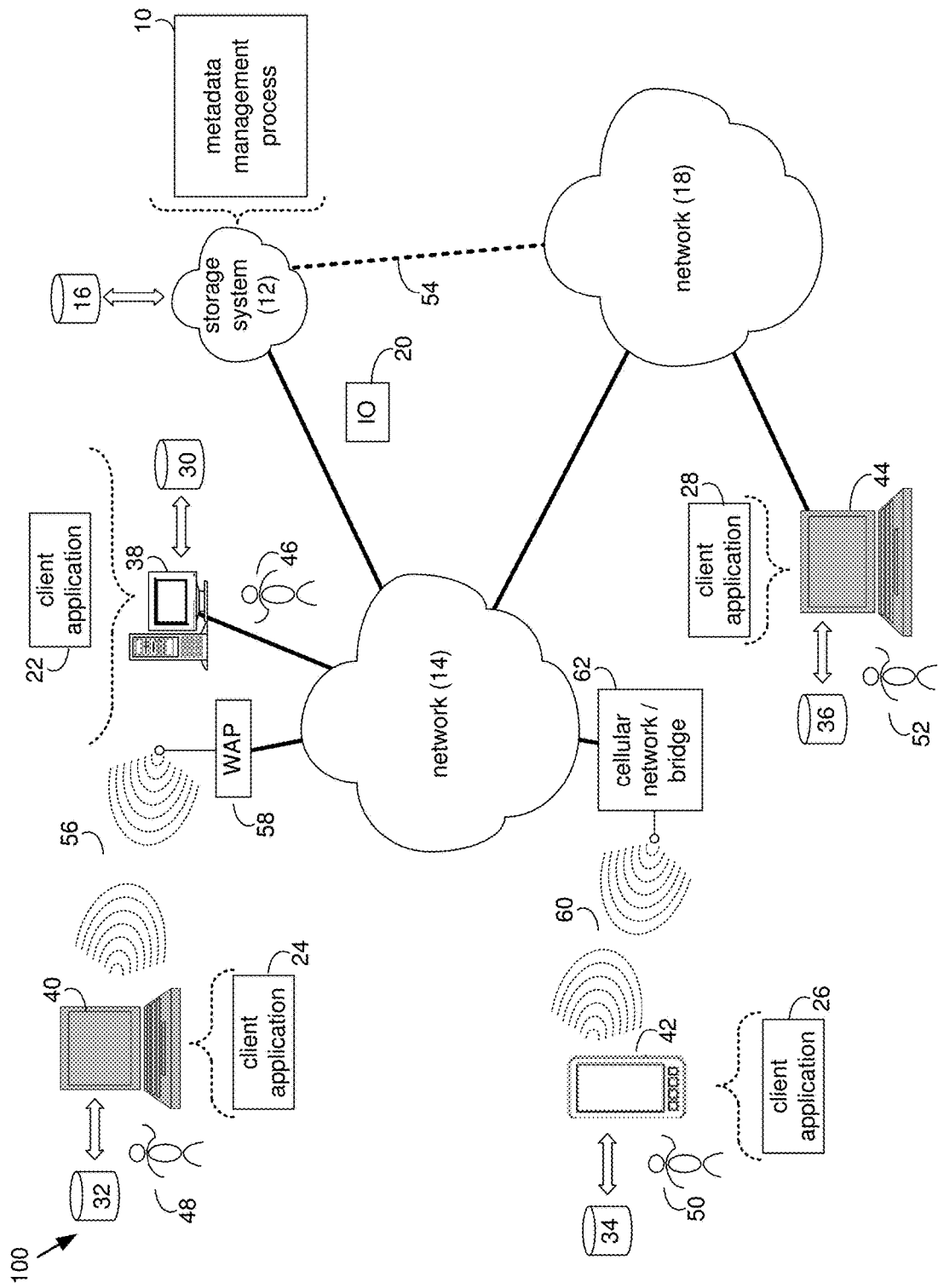
FIG. 1 is an example diagrammatic view of a storage system and a metadata management process coupled to a distributed computing network according to one or more example implementations of the disclosure.

System Overview:

Referring to FIG. 1, there is shown metadata management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as metadata management process 10 of FIG. 1, may include but is not limited to, identifying one or more first layer metadata blocks that map to one or more second layer metadata blocks. A subset of the second layer metadata blocks that map to another second layer metadata block from the one or more second layer metadata blocks may be identified, thus defining one or more redirecting second layer metadata blocks. For each first layer metadata block of the one or more first layer metadata blocks: One or more first layer metadata blocks that map to the one or more redirecting second layer metadata blocks may be determined and the one or more first layer metadata blocks that map to the one or more redirecting second layer metadata blocks may be remapped to map to a target second layer metadata block.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
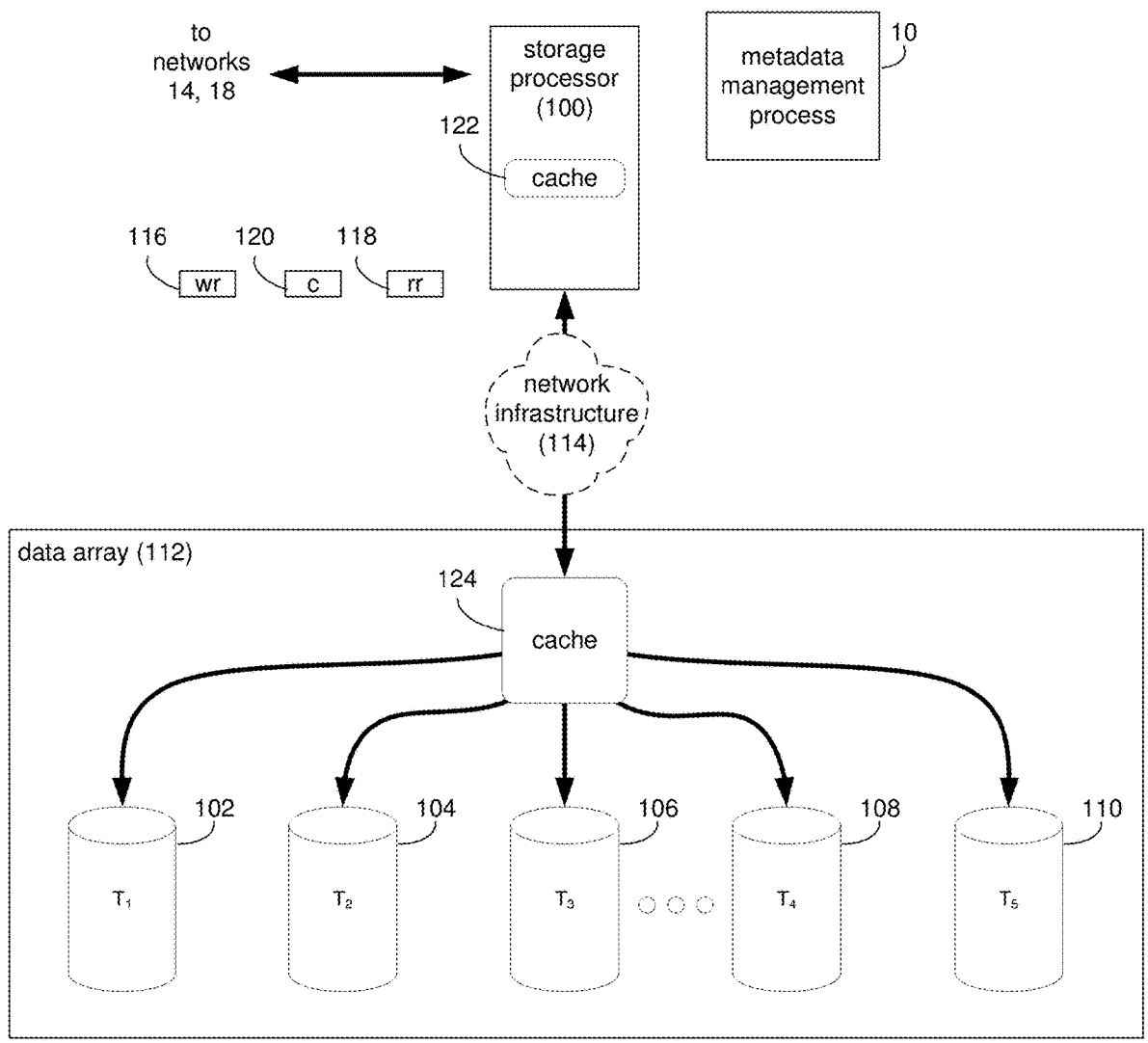
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata management process 10. The instruction sets and subroutines of metadata management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of metadata management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
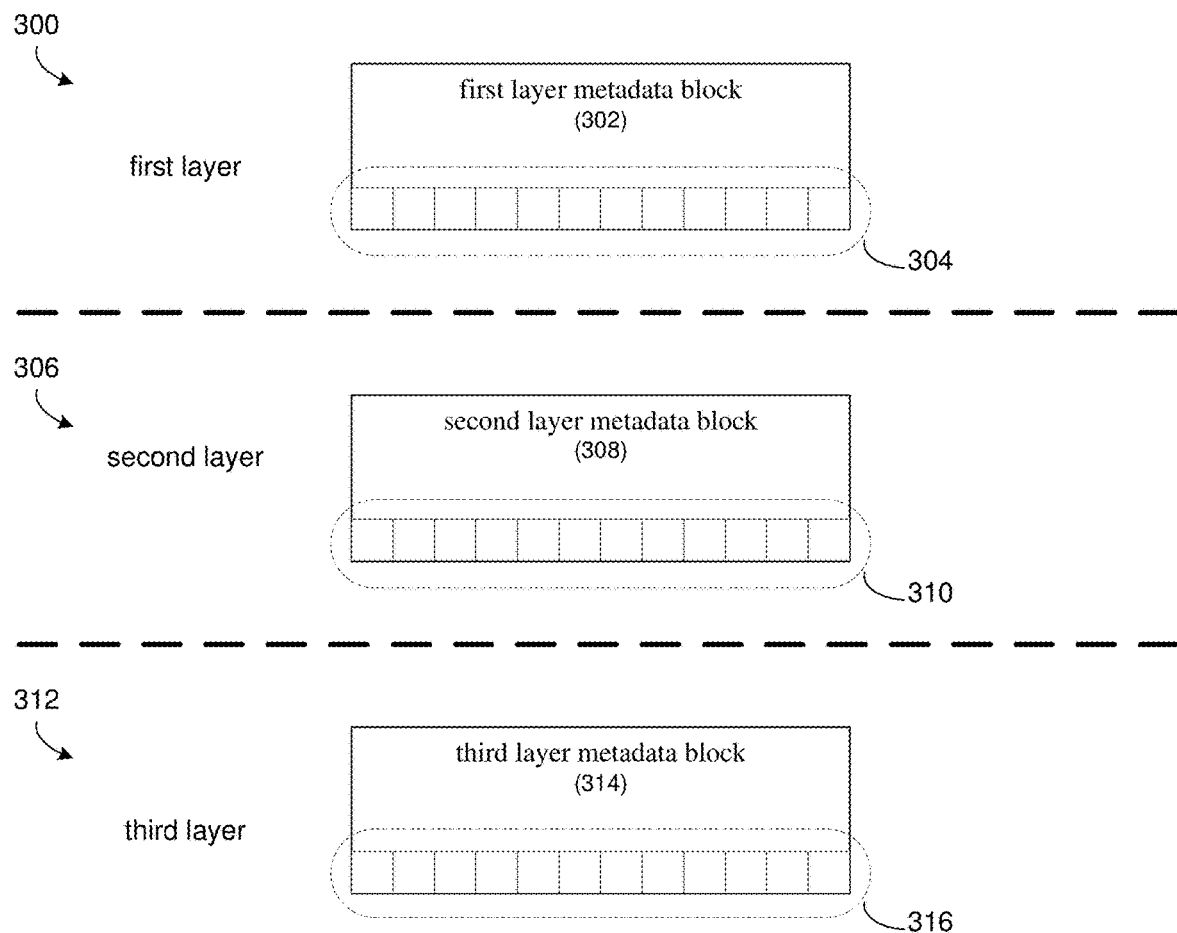
Figure 4:
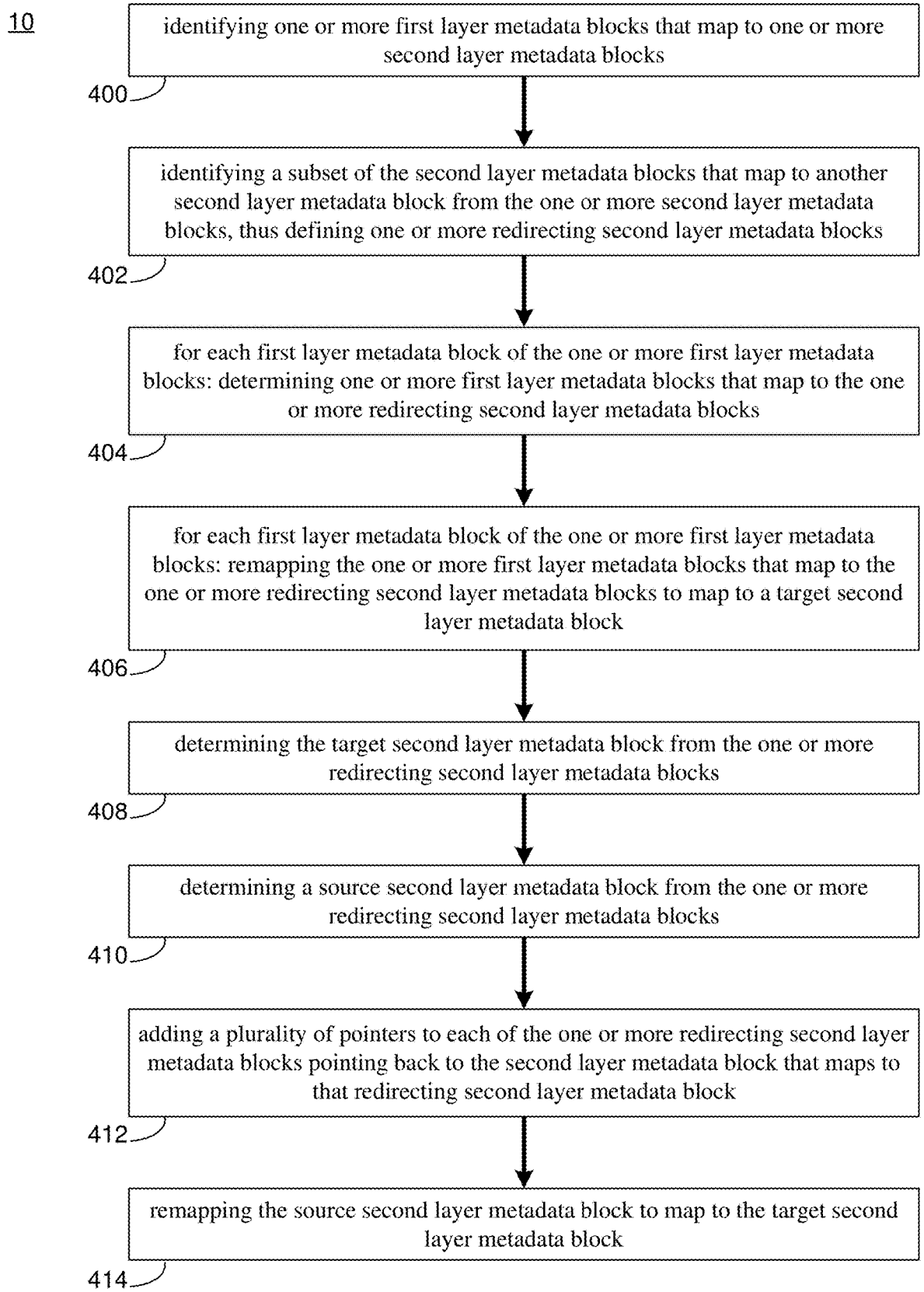
FIG. 4 is an example flowchart of the metadata management process of FIG. 1 according to one or more example implementations of the disclosure.
Figure 5:
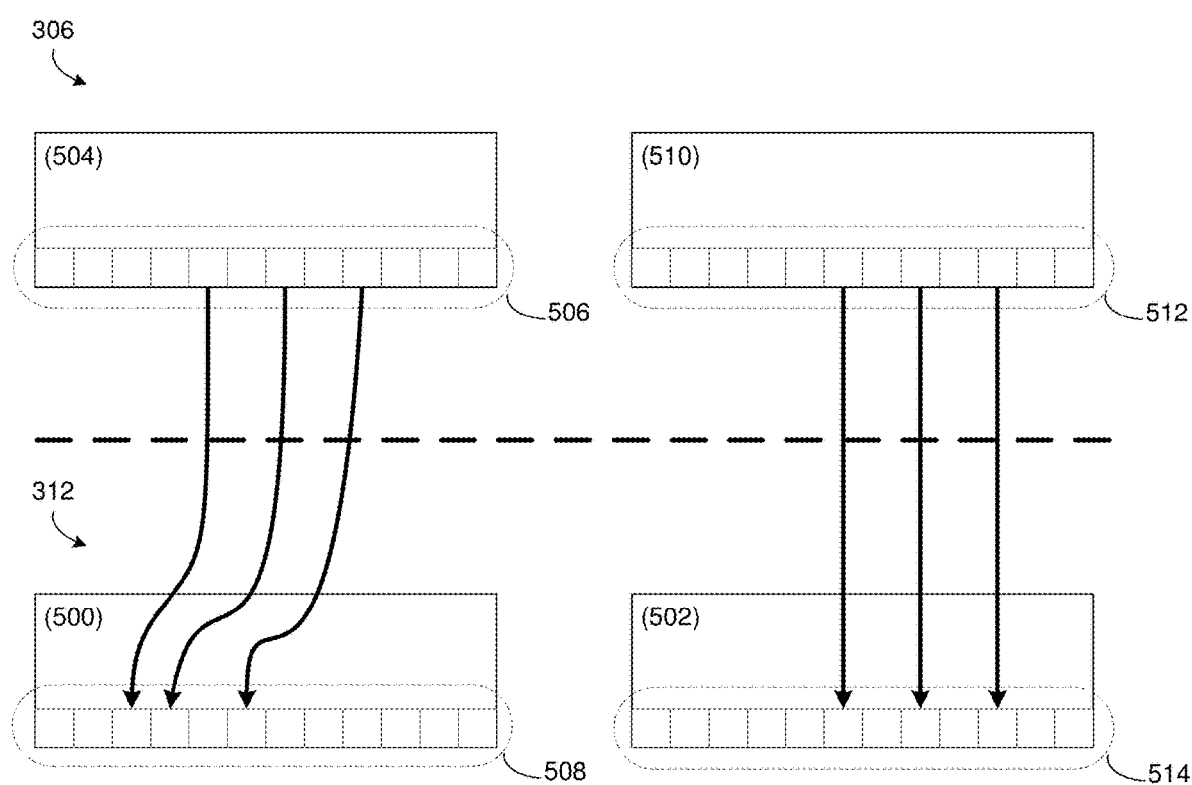
FIGS. 5-11 are example diagrammatic views of the metadata management process of FIG. 1 according to one or more example implementations of the disclosure.
Figure 6:
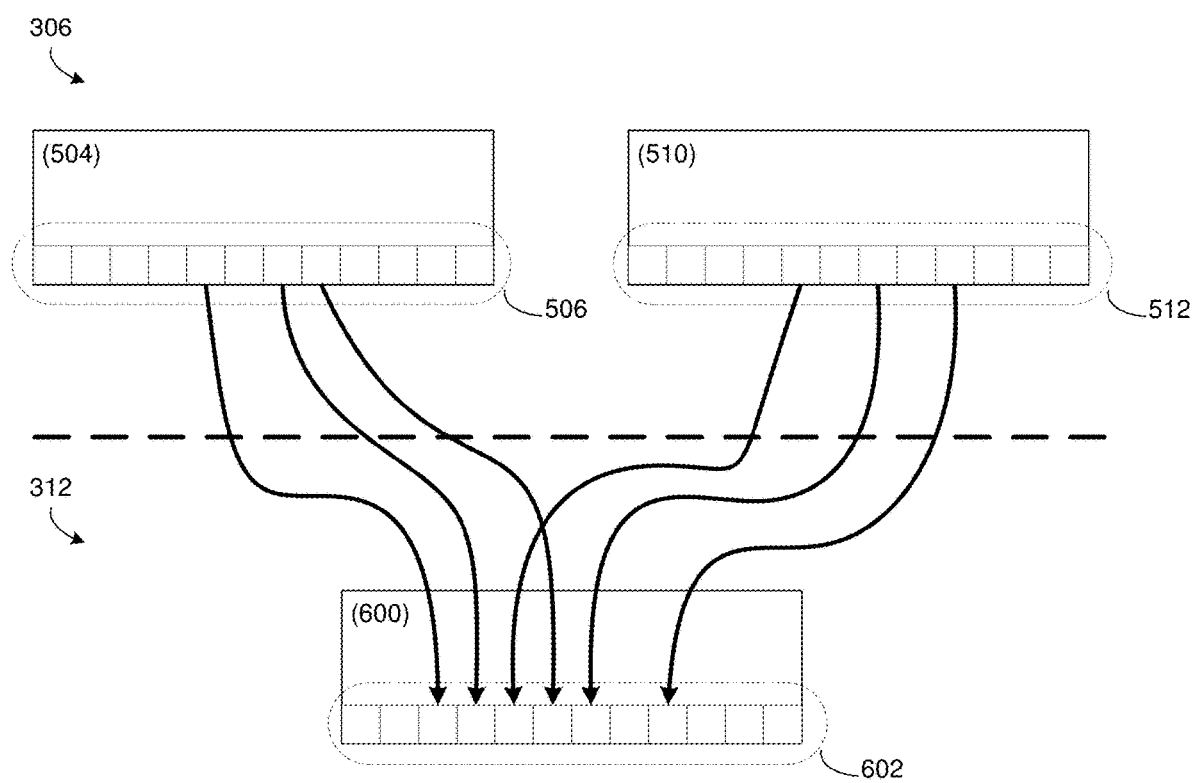

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may also be referred to as a metadata page and may have a predefined amount of storage capacity (e.g., 4 kilobytes) for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

In some implementations, the movement of data from one physical location to another may involve updating the second layer metadata blocks only.

The Metadata Management Process:

Referring also to FIGS. 4-11 and in some implementations, metadata management process 10 may identify 400 one or more first layer metadata blocks that map to one or more second layer metadata blocks. A subset of the second layer metadata blocks that map to another second layer metadata block from the one or more second layer metadata blocks may be identified 402, thus defining one or more redirecting second layer metadata blocks. For each first layer metadata block of the one or more first layer metadata blocks: One or more first layer metadata blocks that map to the one or more redirecting second layer metadata blocks may be determined 404 and the one or more first layer metadata blocks that map to the one or more redirecting second layer metadata blocks may be remapped 406 to map to a target second layer metadata block.

As will be discussed in greater detail below, as data accumulates and is modified in storage systems, various procedures may reorganize or cleanup the data to maintain acceptable latency. For example, modern log structure systems generally employ garbage collection processes to create empty chunks to store user data. These processes may generally include user data relocation which may unfortunately create fragmentation for metadata blocks that map to the user data. As such, latency associated with retrieving data from the storage system may increase. Embodiments of the present disclosure may provide a redirection process to reduce the number of redirections between metadata blocks across various metadata layers.

In some implementations, metadata management process 10 may identify 400 one or more first layer metadata blocks that map to one or more second layer metadata blocks. Referring again to the example of FIG. 3 and in some implementations, one or more first layer metadata blocks (e.g., first layer metadata block 302) may include a plurality of entries or portions (e.g., plurality of entries 304) that point or map to a plurality of entries (e.g., plurality of entries 310) of one or more second layer metadata blocks (e.g., second layer metadata block 308). As discussed above and in some implementations, each entry of the plurality of entries of the one or more first layer metadata blocks is associated with a Logical Block Address (LBA) range.

In some implementations, metadata management process 10 may identify 402 a subset of the second layer metadata blocks that map to another second layer metadata block from the one or more second layer metadata blocks, thus defining one or more redirecting second layer metadata blocks. Referring also to the example of FIGS. 5-6 and in some implementations, metadata management process 10 may initiate a defragmentation process on one or more third layer metadata blocks (e.g., third layer metadata blocks 500, 502). In this example, second layer metadata block 504 may include one or more entries (e.g., one or more entries 506) that map or point to one or more entries (e.g., one or more entries 508) of third layer metadata block 500 and second layer metadata block 510 may include one or more entries (e.g., one or more entries 512) that map or point to one or more entries (e.g., one or more entries 514) of third layer metadata block 502. Metadata management process 10 may take data from the third layer metadata blocks (e.g., third layer metadata blocks 500, 502) and write the data into a single third layer metadata block (e.g., third layer metadata block 600). Metadata management process 10 may then release third layer metadata blocks 500, 502 for storing new user data. Metadata management process 10 may then remap the entries (e.g., one or more entries 506, 512) of second layer metadata blocks 504, 510 that mapped to the entries (e.g., one or more entries 508, 514) of third layer metadata blocks 500, 502 to map to entries (e.g., one or more entries 602) of third layer metadata block 600. While metadata management process 10 may release third layer metadata blocks 500, 502, now two second layer metadata blocks map or point to a single third layer metadata block. In some implementations, a subsequent defragmentation operation on the third layer metadata block may lead to four second layer metadata blocks mapping or pointing to a single third layer metadata block. As such, the second layer metadata blocks may become more fragmented after each defragmentation operation performed on third layer metadata blocks.

To address at least the above problems discussed above related to second layer metadata block fragmentation, metadata management process 10 may assign each second layer metadata block a generation index. In some implementations, entries of a first layer metadata block may point or map to entries of a second layer metadata block, where the second layer metadata block has a specific generation index. Metadata management process 10 may redirect an original second layer metadata block to a new second layer metadata blocks by moving an entry from the original second layer metadata block to the new second layer metadata block, increasing the generation index of the original second layer metadata block, and storing a link to the new second layer metadata block in a redirection table within the original second layer metadata block. In this manner the mappings of the first layer metadata blocks to the second layer metadata blocks are maintained.

Figure 7:
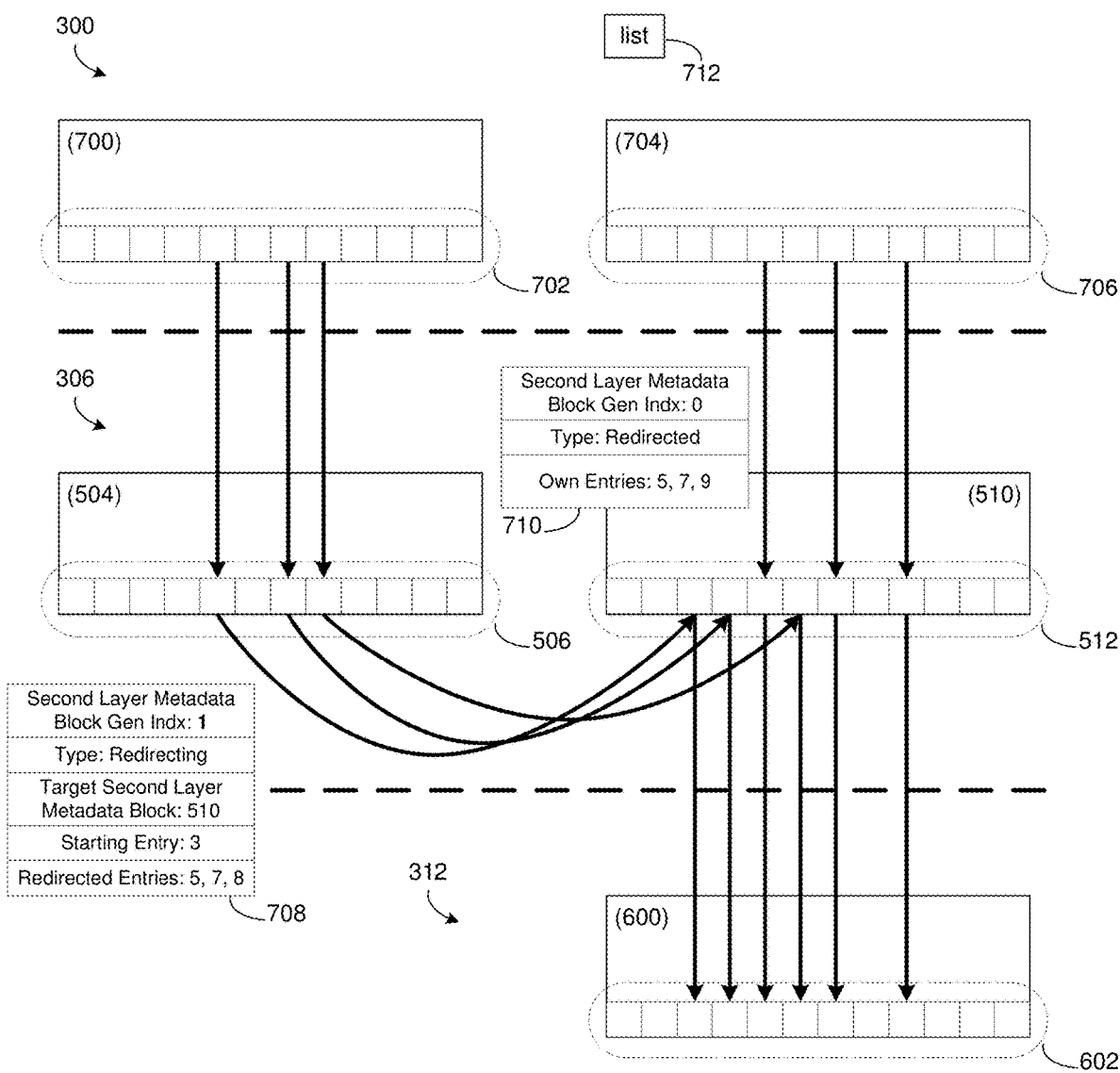
Figure 8:
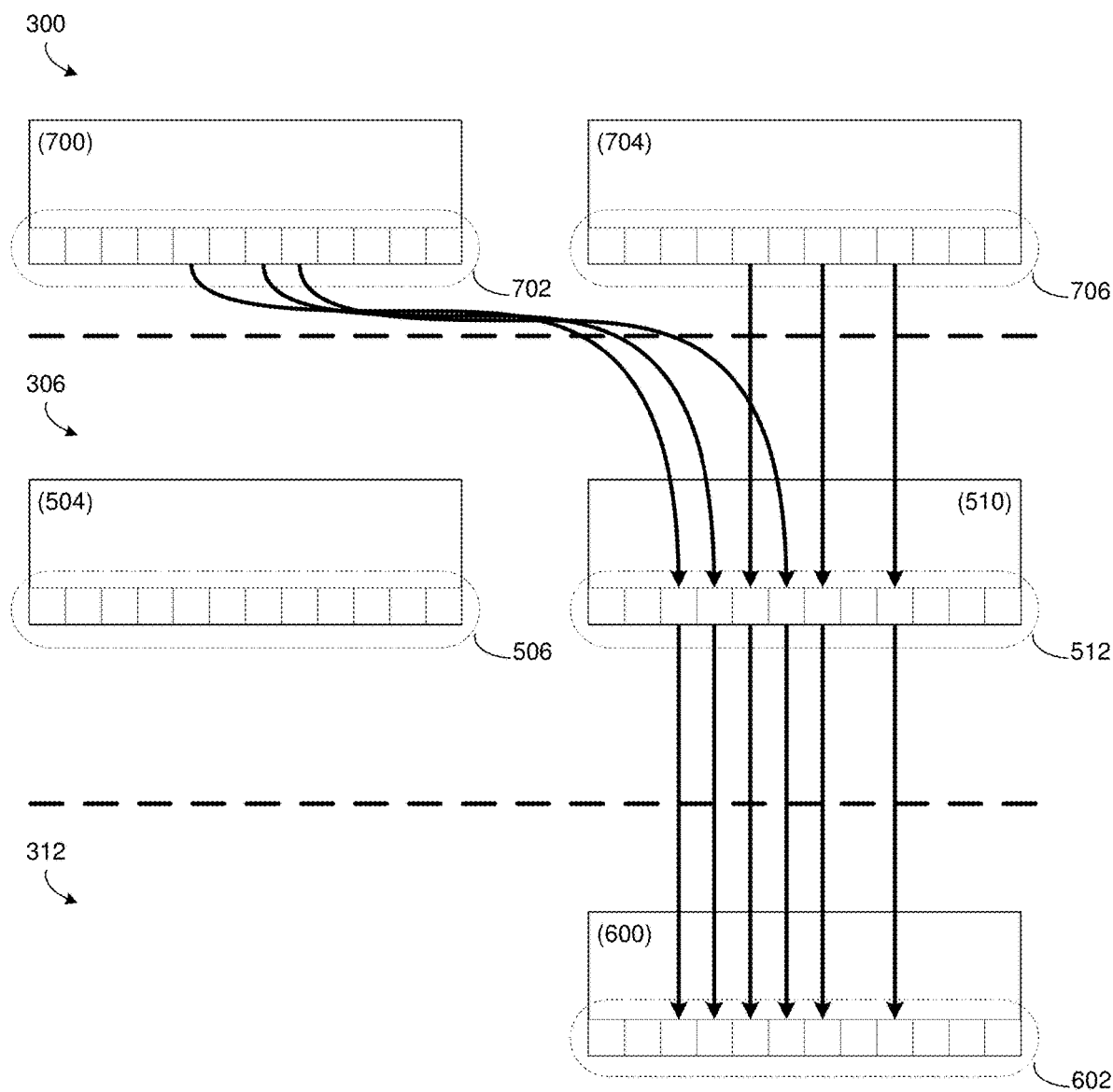
Figure 9:
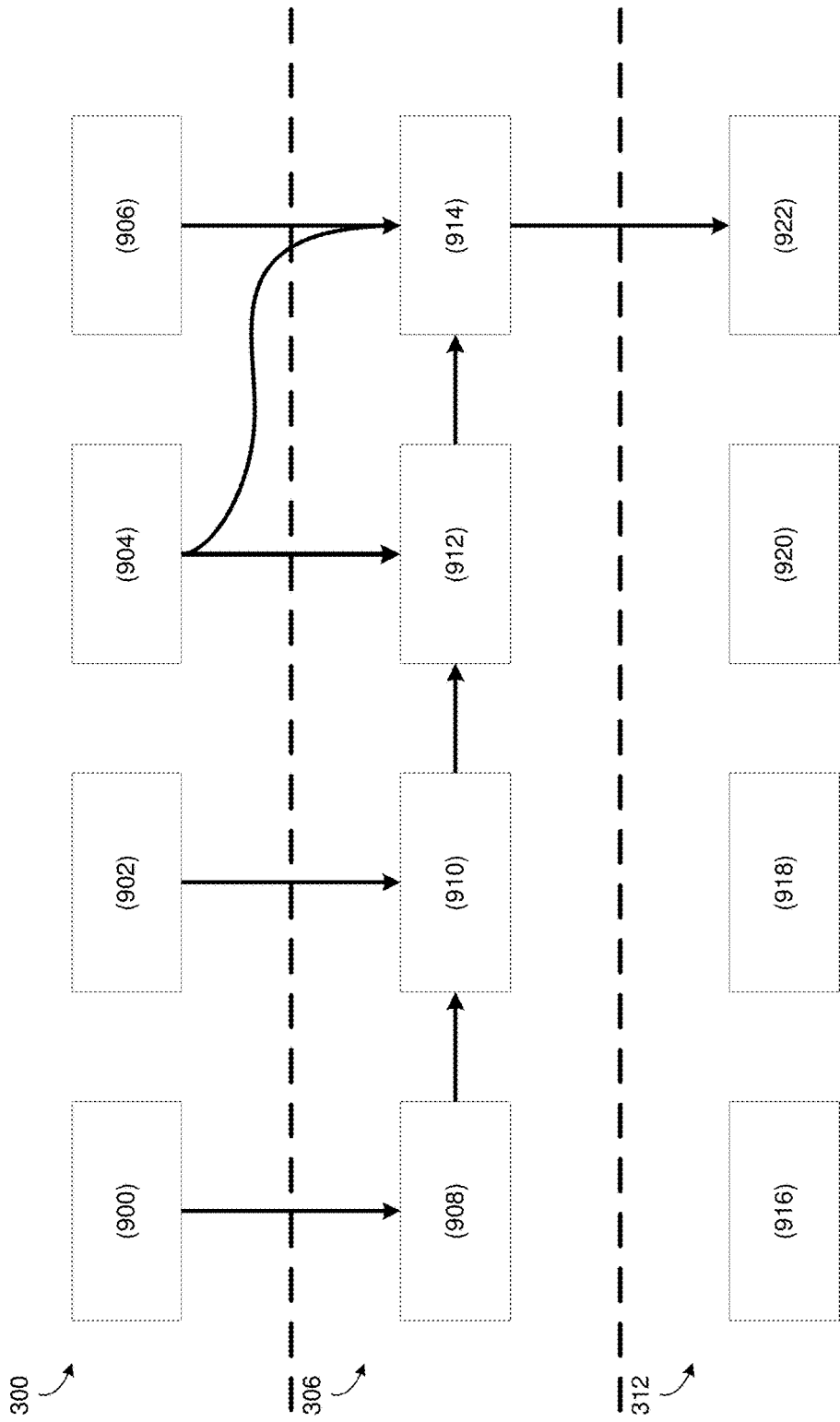
Figure 10:
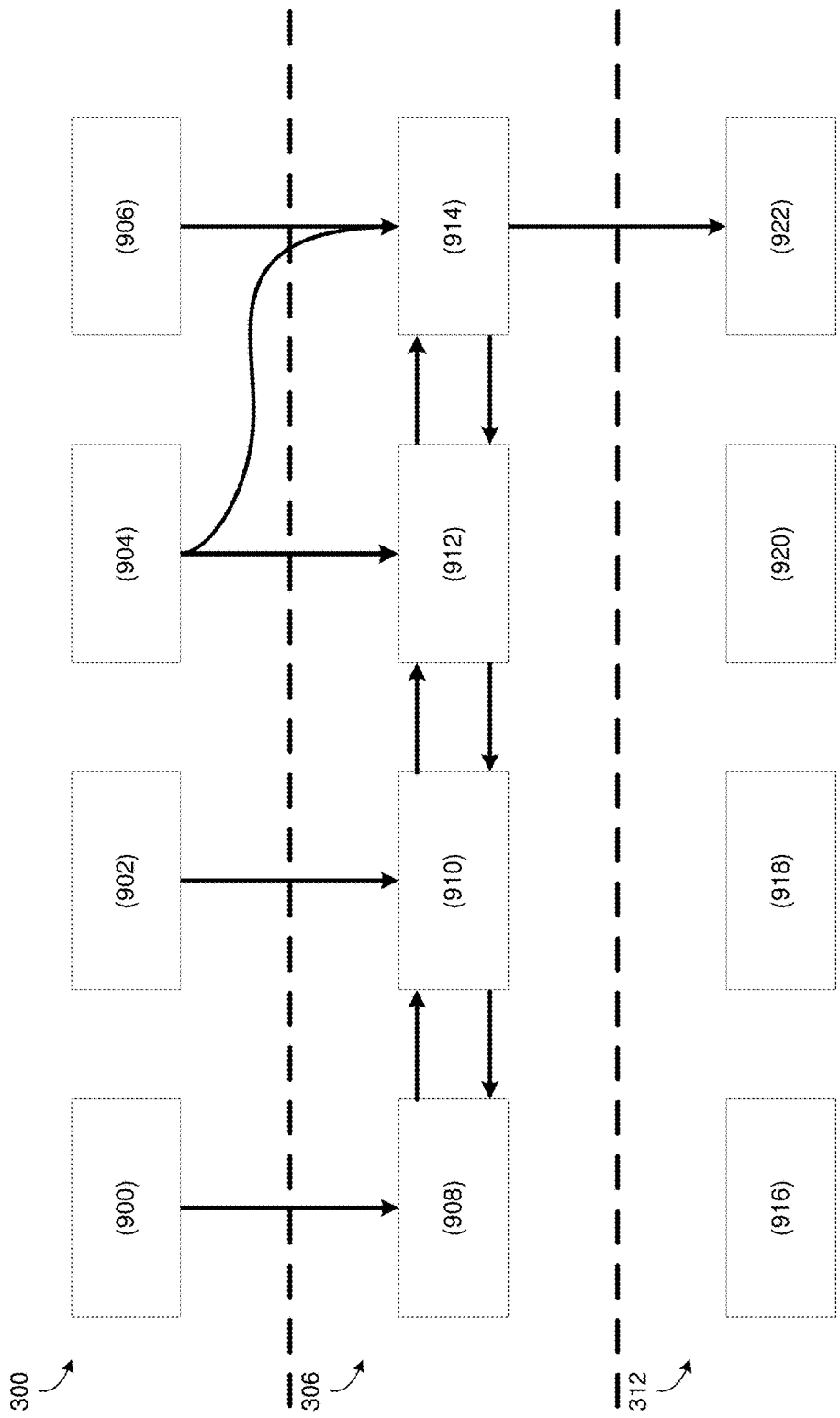

Referring also to the examples of FIGS. 7-8 and in some implementations, metadata management process 10 may identify 400 first layer metadata block 700 with one or more entries 702 and first layer metadata block 704 with one or more entries 706. In some implementations, metadata management process 10 may redirect one or more second layer metadata blocks (e.g., second layer metadata block 504) to another second layer metadata block (e.g., second layer metadata block 510). In this example, metadata management process 10 may redirect the pointers (e.g., demonstrated as arrows in FIG. 7) from the entries (e.g., one or more entries 506) of second layer metadata block 504 to the entries (e.g., one or more entries 512) of second layer metadata block 510. Metadata management process 10 may increase the second layer metadata block generation index in the redirection table (e.g., redirection table 708) associated with second layer metadata block 504. As shown in FIG. 7, metadata management process 10 may redirect the pointers from entries of second layer metadata block 504 to entries of second layer metadata block 510. In some implementations, metadata management process 10 may update a redirection table (e.g., redirection tables 708, 710) of each second layer metadata block (e.g., second layer metadata blocks 504, 510) to include links and other details regarding the redirection to the next second layer metadata block. In this manner, the pointers from first metadata block (e.g., first metadata block 700) may not be changed by the redirection.

As discussed above, the process of redirecting entries of second layer metadata blocks may help alleviate fragmentation of second layer metadata blocks. However, this process may create a different problem of redirected second layer metadata blocks. For example, during a read flow, in order to get to user data, the following objects or blocks may be read:

1. A first layer metadata block—to get a second layer metadata block address.

2. A second layer metadata block—to get the location of the third layer metadata block (e.g., the location of the physical data).

3. If the second layer metadata is a redirecting second layer metadata block that maps to another second layer metadata block, all the second layer metadata blocks may be read to determine the third layer metadata reference from the last second layer metadata block in the redirection chain.

4. A third layer metadata block—to read the user data.

This may generally create the following challenges:

1. Each element in a redirection chain adds performance penalty.

2. In time, redirection chains tends to grow noticeably (uncontrolled) and so each access requires unpredictable quantity of additional reads.

Without restraining redirection, the long running system might suffer from performance degradation and inability to perform any more redirections. Additionally, these problems may lead to second layer metadata block overutilization and shortage of second layer metadata blocks in the system. As will be discussed in greater detail below, embodiments of the present disclosure may address at least these challenges.

In some implementations, metadata management process 10 may identify 402 a subset of the second layer metadata blocks that map to another second layer metadata block from the one or more second layer metadata blocks, thus defining one or more redirecting second layer metadata blocks. The subset of the second layer metadata blocks that map to another second layer metadata block from the one or more second layer metadata blocks may include a subset of second layer metadata blocks, where each second layer metadata block of the subset of second layer metadata blocks maps to another second layer metadata block.

In the example of FIG. 7, metadata management process 10 may identify that second layer metadata block 504 maps to another second layer metadata block (e.g., second layer metadata block 510). In some implementations, metadata management process 10 may add each identified 402 second layer metadata block to a list of redirected second layer metadata blocks (e.g., list 712). In some implementations, list 712 may be volatile. For example, after a restart of a storage processor, metadata management process 10 may identify 402 the subset of second layer metadata blocks that map to another second layer metadata block by scanning each second layer metadata block. As will be discussed in greater detail below, the list may use a pointer to point to a second layer metadata block in the list of redirected second layer metadata blocks. In some implementations, all redirected entries from redirecting second layer metadata blocks may be added to list 712. In this manner, scanning every entry of a first layer metadata block against this list (i.e., if first layer metadata block entry points to an entry in the list, metadata management process 10 may remap or redirect these entries of first layer metadata block) ensures that all entries in the list must not be redirected anymore and released. Accordingly, metadata management process 10 may ensures limited lifetime for redirections. In response to remapping 406 the one or more entries of a first layer metadata block to a target second layer metadata block, metadata management process 10 may clear the list of redirected second layer metadata blocks (e.g., list 712).

In some implementations, metadata management process 10 may, for each first layer metadata block of the one or more first layer metadata blocks, determine 404 one or more first layer metadata blocks that map to the one or more redirecting second layer metadata blocks. Referring again to the example of FIG. 7 and in some implementations, metadata management process 10 may determine 404 that first layer metadata block 700 maps to redirecting second layer metadata block 504. While an example of one first layer metadata block and one second layer metadata block has been provided, it will be appreciated that any number of first layer metadata blocks may map to any number of second layer metadata blocks within the scope of the present disclosure.

In some implementations, metadata management process 10 may, for each first layer metadata block of the one or more first layer metadata blocks, remap 406 the one or more first layer metadata blocks that map to the one or more redirecting second layer metadata blocks to map to a target second layer metadata block. Referring also to the example of FIG. 8 and in some implementations, metadata management process 10 may remap 406 the one or more entries (e.g., one or more entries 702) of first layer metadata block 700 that point to second layer metadata block 504 (e.g., redirecting second layer metadata block) to a target second layer metadata block. As will be discussed in greater detail below, metadata management process 10 may determine a target second layer metadata block from the redirecting second layer metadata blocks. In the example of FIG. 8, metadata management process 10 may remap 406 the one or more entries (e.g., one or more entries 702) of first layer metadata block 700 to map to the entries (e.g., one or more entries 512) of the target second layer metadata block (e.g., second layer metadata block 510). In some implementations and in response to remapping 406 the one or more entries of first layer metadata block to map to the one or more entries of the target second layer metadata block, metadata management process 10 may determine if the second layer metadata block is redirected and may fix the redirection.

In some implementations, metadata management process 10 may determine 408 the target second layer metadata block from the one or more redirecting second layer metadata blocks. As discussed above and in some implementations, metadata management process 10 may determine a target second layer metadata block for a chain of redirecting second layer metadata blocks. A target second layer metadata block may generally include the final second layer metadata block in a chain of redirecting second layer metadata blocks. Referring also to the example of FIG. 9, suppose a storage system has e.g., four first layer metadata blocks (e.g., first layer metadata blocks 900, 902, 904, 906); e.g., four second layer metadata blocks (e.g., second layer metadata blocks 908, 910, 912, 914); and e.g., four third layer metadata blocks (e.g., third layer metadata blocks 916, 918, 920, 922). In this example, suppose that entries of first layer metadata block 900 map or point to entries of second layer metadata block 908, entries of first layer metadata block 902 map to entries of second layer metadata block 910, entries of first layer metadata block 904 map to entries of second layer metadata block 912 and entries of second layer metadata block 914, and that entries of first layer metadata block 906 map to entries of second layer metadata block 914. In this example, second layer metadata block 908 maps to second layer metadata block 910, second layer metadata block 910 maps to second layer metadata block 912, and second layer metadata block 912 maps to second layer metadata block 914. As such, second layer metadata blocks 908, 910, 912, 914 may define a chain of redirecting second layer metadata blocks. In this example, metadata management process 10 may determine 408 that second layer metadata block 914 is the target second layer metadata block.

In some implementations, metadata management process 10 may determine 410 a source second layer metadata block from the one or more redirecting second layer metadata blocks. A source second layer metadata block may generally include the first or initial second layer metadata block of a chain of redirecting second layer metadata blocks. It will be appreciated that a chain of redirection second layer metadata blocks may be defined per entry or groups of entries pointed to by one or more entries of a first layer metadata block. Returning to the example of FIG. 9, metadata management process 10 may determine 410 second layer metadata block 908 to be the source second layer metadata block of the chain of redirecting second layer metadata blocks for a particular entry or group of entries while second layer metadata block 910 may be the source second layer metadata block of a chain of redirecting second layer metadata blocks for a different entry or group of entries. In this manner, multiple source second layer metadata blocks may be determined 410 within the scope of the present disclosure.

In some implementations, metadata management process 10 may limit the number of redirections between second layer metadata blocks in a chain of redirecting second layer metadata blocks. For example, metadata management process 10 may add 412 a plurality of pointers to each of the one or more redirecting second layer metadata blocks pointing back to the second layer metadata block that maps to that redirecting second layer metadata block. Referring also to the example of FIG. 10, metadata management process 10 may add a plurality of pointers or back-pointers to each redirecting second layer metadata block pointing back to the second layer metadata block from which the second layer metadata block is redirected from. For example, metadata management process 10 may add 412 a pointer (e.g., represented by the arrows between second layer metadata blocks) pointing back from second layer metadata block 914 to second layer metadata block 912. Similarly, metadata management process 10 may add 412 a pointer pointing back from second layer metadata block 912 to second layer metadata block 910 and from second layer metadata block 910 to second layer metadata block 908.

Figure 11:
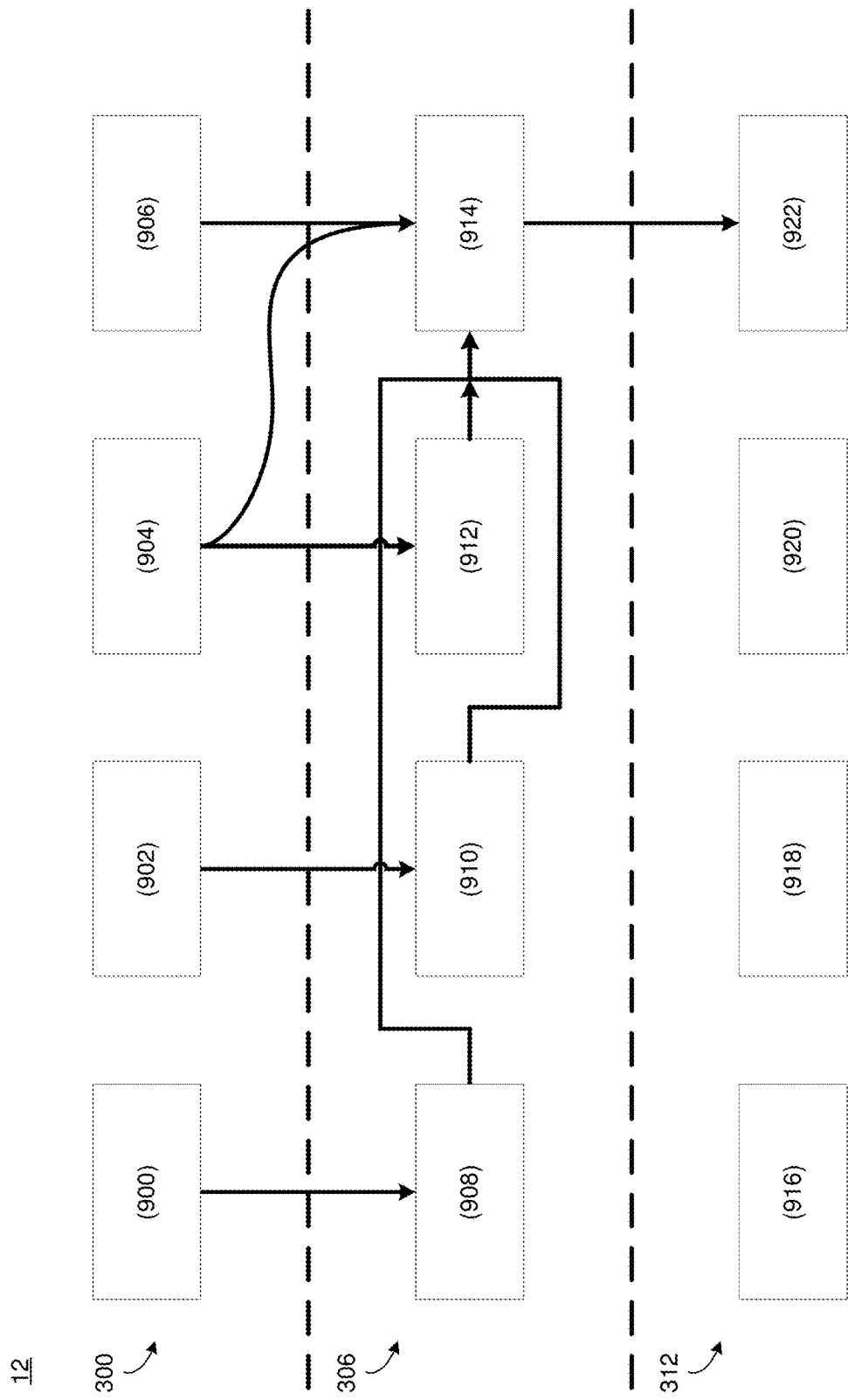

In some implementations, metadata management process 10 may remap 414 the source second layer metadata block to map to the target second layer metadata block. Referring again to the example of FIG. 10 and in some implementations, suppose that second layer metadata block 908 redirects to 910, that second layer metadata block 910 redirects to second layer metadata block 912, and that second layer metadata block 912 redirects to second layer metadata block 914. In some implementations, as opposed to the nested redirections shown in FIG. 10, metadata management process 10 may, via the back pointers added 414 between each redirecting second layer metadata block, remap 414 or redirect direct each of second layer metadata blocks 908, 910 directly to the target second layer metadata block 914. In this manner, the amount of read operations required in the nested redirection example of FIG. 10 may be avoided (e.g., reading second layer metadata block 908, redirecting to and reading second layer metadata block 910, then redirecting to and reading second layer metadata block 912, and redirecting to and reading second layer metadata block 914. Accordingly, only two second layer metadata blocks are read for each redirection. For example and as shown in FIG. 11, each of source second layer metadata blocks 908, 910, 912 may be redirected directly to target second layer metadata block 914. In this manner, metadata management process 10 may reduce the number of redirections in a chain of redirecting second layer metadata blocks.

In some implementations, metadata management process 10 may remap 414 the source second layer metadata block to map to the target second layer metadata block before or after remapping 406 or redirecting the one or more entries of the first layer metadata block, as discussed above. Remapping 414 the source second layer metadata block to map to the target second layer metadata block before remapping 406 or redirecting the one or more entries of the first layer metadata block may reduce the total average number of redirections but may increase the latency of single redirect, since it should synchronously fix a second layer metadata block redirection. However, it will be appreciated that remap 414 the source second layer metadata block to map to the target second layer metadata block after remapping 406 or redirecting the one or more entries of the first layer metadata block may have similar benefits and disadvantages.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    identifying, via the computing device, one or more first layer metadata blocks that map to one or more second layer metadata blocks;
    identifying a subset of the second layer metadata blocks that map to another second layer metadata block from the one or more second layer metadata blocks, thus defining one or more redirecting second layer metadata blocks;
    for each first layer metadata block of the one or more first layer metadata blocks:
        determining one or more first layer metadata blocks that map to the one or more redirecting second layer metadata blocks; and
        remapping the one or more first layer metadata blocks that map to the one or more redirecting second layer metadata blocks to map to a target second layer metadata block.

2. The computer-implemented method of claim 1, wherein the one or more second layer metadata blocks map to one or more third layer metadata blocks configured to store user data.

3. The computer implemented method of claim 1, further comprising:
    determining the target second layer metadata block from the one or more redirecting second layer metadata blocks.

4. The computer-implemented method of claim 3, further comprising:
    determining at least one source second layer metadata block from the one or more redirecting second layer metadata blocks.

5. The computer-implemented method of claim 4, further comprising:
    adding a plurality of pointers to each of the one or more redirecting second layer metadata blocks pointing back to the second layer metadata block that maps to that redirecting second layer metadata block.

6. The computer implemented method of claim 5, further comprising:
    remapping the source second layer metadata block to map to the target second layer metadata block.

7. The computer-implemented method of claim 1, wherein each entry of the plurality of entries of the one or more first layer metadata blocks is associated with a Logical Block Address (LBA) range.

8. A computer program product residing on a non-transitory computer readable medium having a plurality of instructions stored thereon which, when executed by a processor, cause the processor to perform operations comprising:
    identifying one or more first layer metadata blocks with a plurality of entries mapping to a plurality of entries of one or more second layer metadata blocks;
    identifying a subset of the second layer metadata blocks that map to another second layer metadata block from the one or more second layer metadata blocks, thus defining one or more redirecting second layer metadata blocks;

for each first layer metadata block of the one or more first layer metadata blocks:
- determining one or more first layer metadata blocks that map to the one or more redirecting second layer metadata blocks; and
- remapping the one or more first layer metadata blocks that map to the one or more redirecting second layer metadata blocks to map to a target second layer metadata block.

9. The computer program product of claim 8, wherein the one or more second layer metadata blocks map to one or more third layer metadata blocks configured to store user data.

10. The computer program product of claim 8, further comprising:
- determining the target second layer metadata block from the one or more redirecting second layer metadata blocks.

11. The computer program product of claim 10, further comprising:
- determining a source second layer metadata block from the one or more redirecting second layer metadata blocks.

12. The computer program product of claim 11, further comprising:
- adding a plurality of pointers to each of the one or more redirecting second layer metadata blocks pointing back to the second layer metadata block that maps to that redirecting second layer metadata block.

13. The computer program product of claim 12, further comprising:
- remapping the source second layer metadata block to map to the target second layer metadata block.

14. The computer program product of claim 8, wherein each entry of the plurality of entries of the one or more first layer metadata blocks is associated with a Logical Block Address (LBA) range.

15. A computing system including a processor and memory configured to perform operations comprising:
- identifying one or more first layer metadata blocks with a plurality of entries mapping to a plurality of entries of one or more second layer metadata blocks;
- identifying one or more second layer metadata blocks that map to another second layer metadata block from the one or more second layer metadata blocks, thus defining one or more redirecting second layer metadata blocks;
- for each first layer metadata block of the one or more first layer metadata blocks:
  - determining one or more first layer metadata blocks that map to the one or more redirecting second layer metadata blocks; and
  - remapping the one or more first layer metadata blocks that map to the one or more redirecting second layer metadata blocks to map to a target second layer metadata block.

16. The computing system of claim 15, wherein the one or more second layer metadata blocks map to one or more third layer metadata blocks configured to store user data.

17. The computing system of claim 15, further comprising:
- determining the target second layer metadata block from the one or more redirecting second layer metadata blocks.

18. The computing system of claim 17, further comprising:
- determining a source second layer metadata block from the one or more redirecting second layer metadata blocks.

19. The computing system of claim 17, further comprising:
- adding a plurality of pointers to each of the one or more redirecting second layer metadata blocks pointing back to the second layer metadata block that maps to that redirecting second layer metadata block.

20. The computing system of claim 19, further comprising:
- remapping the source second layer metadata block to map to the target second layer metadata block.

* * * * *